(12) United States Patent
Hynes

(10) Patent No.: US 6,490,841 B2
(45) Date of Patent: Dec. 10, 2002

(54) COMPOSITE PLASTIC/WOOD FLOUR BUILDING CONSTRUCTION SYSTEM

(76) Inventor: Thomas C. Hynes, 916 Willowbrook St., Allen, TX (US) 75002

( * ) Notice: Subject to any disclaimer, the term of this patent is extended or adjusted under 35 U.S.C. 154(b) by 35 days.

(21) Appl. No.: 09/832,588

(22) Filed: Apr. 11, 2001

(65) Prior Publication Data

US 2002/0148191 A1 Oct. 17, 2002

(51) Int. Cl.[7] .................................................. E04C 3/30
(52) U.S. Cl. ...................... 52/729.2; 52/730.6; 52/736.2; 403/403
(58) Field of Search .............................. 52/729.1, 729.2, 52/730.1, 730.6, DIG. 8, 736.2; 403/388, 403, 188

(56) References Cited

U.S. PATENT DOCUMENTS

| | | | |
|---|---|---|---|
| 152,794 A | | 7/1874 | Coolidge et al. |
| 542,283 A | | 7/1895 | Rousseau |
| 4,737,532 A | * | 4/1988 | Fujita et al. .................. 524/13 |
| 5,065,556 A | * | 11/1991 | Delong et al. ................. 52/221 |
| 5,189,860 A | | 3/1993 | Scott ............................. 52/729 |
| 5,233,807 A | | 8/1993 | Spera ............................ 52/729 |
| 5,497,594 A | * | 3/1996 | Giuseppe et al. ........... 52/730.4 |
| 5,744,228 A | | 4/1998 | Tingley .................... 428/292.4 |
| 5,974,760 A | | 11/1999 | Tingley ..................... 52/729.1 |
| 6,344,268 B1 | * | 2/2002 | Stucky et al. ............. 428/317.9 |

\* cited by examiner

Primary Examiner—Carl D. Friedman
Assistant Examiner—Naoko Slack
(74) Attorney, Agent, or Firm—Konneker & Smith, P.C.

(57) ABSTRACT

A building construction framing system utilizes studs and joining members which are respectively extruded and molded from a composite plastic/wood flour material. Along its length, each stud has a central web with transverse outer edge flanges and an intermediate transverse flange that defines with the outer edge flanges a separated pair of longitudinally extending lateral pockets on each side of the web. A series of first studs are arranged in a spaced apart, parallel relationship with their opposite ends abutting parallel, spaced apart second and third studs. The joining members are positioned at the opposite ends of the first studs, are recessed in the lateral pockets of the first, second and third studs, and are secured to their adjacent studs using suitable fastening members.

23 Claims, 4 Drawing Sheets

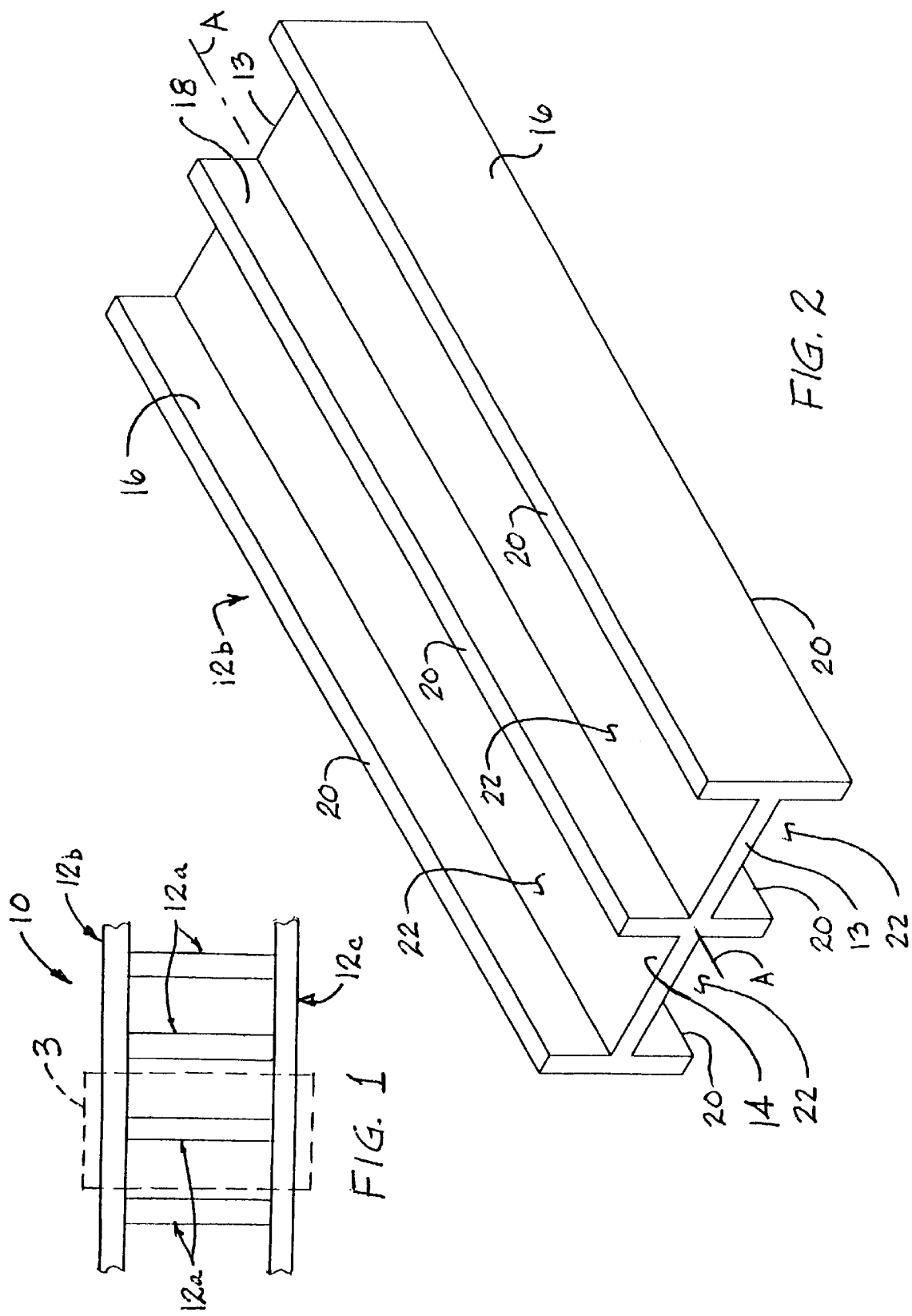

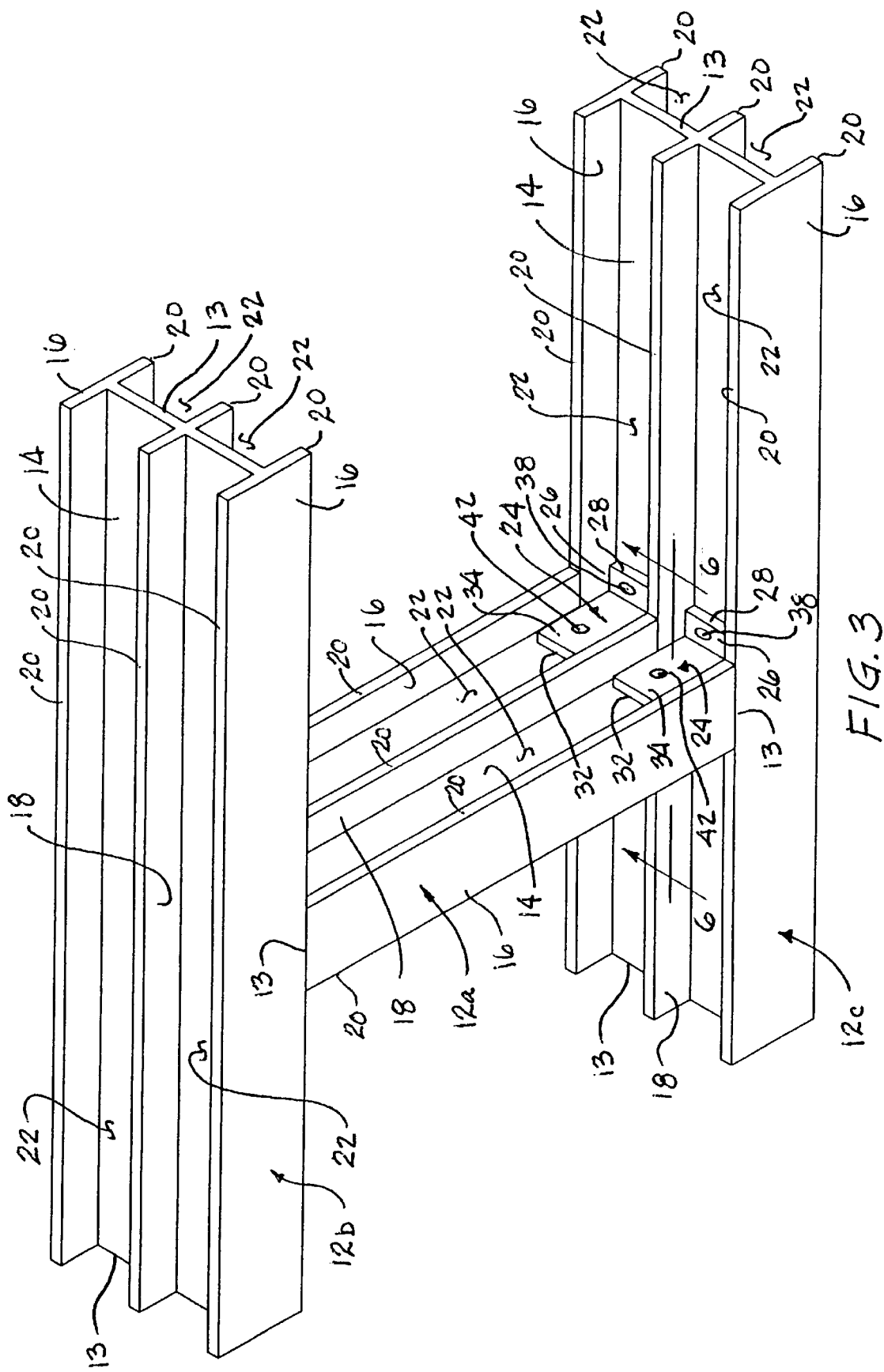

COMPOSITE PLASTIC/WOOD FLOUR BUILDING CONSTRUCTION SYSTEM

BACKGROUND OF THE INVENTION

The present invention generally relates to building construction systems and the elements therein and, in a preferred embodiment thereof, more particularly relates to a building construction system in which specially configured extruded composite plastic/wood studs are transversely secured to one another using specially configured molded composite plastic/wood joining members.

Conventional wood framing structures, such as those used for walls in houses and other buildings, are typically formed from a spaced series of vertical solid wood studs which have rectangular cross-sections and are nailed at their opposite ends to horizontal top and bottom studs (typically referred to as top and bottom "plates") which are also of a solid wood construction and have rectangular cross-sections. After a framing structure of this type is supported in its final orientation (for example vertically for a wall structure) a wall-finishing material such as drywall may be suitably secured to its opposite sides.

While this conventional type of wooden stud framing structure has been used for many years, and is generally suitable for its intended purpose, it is subject to a variety of well known problems, limitations and disadvantages. For example, solid wood studs are relatively heavy, are becoming increasingly expensive, are subject to warpage due to loss of moisture content, are susceptible to moisture and fire damage, and are also subject to the predation of various types of insects such as termites. Additionally, of course, the expanding use of solid wood construction as population increases further depletes vital forest areas. Moreover, the joints in this type of solid wood stud construction are typically formed by toenailing two transversely abutting studs together. AS is well known, this type of conventional stud joining technique forms a relatively weak joint one that is particularly susceptible to damage from twisting forces applied to the joint.

As can readily be seen from the foregoing, a need exists for an improved wood-based building construction system which eliminates or at least substantially reduces the above-mentioned problems, limitations and disadvantages commonly associated with building construction systems incorporating solid wood studs as generally described above. It is to this need that the present invention is primarily directed.

SUMMARY OF THE INVENTION

In carrying out principles of the present invention, in accordance with a preferred embodiment thereof, a specially designed construction system is provided which is representatively in the form of a framing assembly in which a spaced series of parallel stud members are transversely and abuttingly anchored at their opposite ends to a spaced pair of similar stud members using specially designed connection members.

According to a feature of the feature of the present invention, each of the stud members and connection members, in preferred embodiments thereof, are formed from a mixture of a plastic material and a non-plastic filler material, with the stud members preferably being and the connection members preferably being injection moldings.

Illustratively, the plastic/non-plastic mixture used to form the studs is a mixture of a polyethylene material and wood flour having a representative constituent weight ratio of about 60 percent polyethylene and about 40 percent wood flour, with the mixture also preferably including a suitable fire retardant material.

Each of the extruded stud members, in a preferred embodiment thereof, has a special configuration in which the stud member has, along its length, a cross-section defined by a substantially planar rectangular web having opposite side edges, first and second substantially planar transverse flanged formed on the opposite side edges, and a third substantially planar transverse flange formed on a central portion of the web and being parallel to the first and second flanges. The first, second and third flanges have first outer side edges lying in a first plane on a first side of the web, and second outer side edges lying in a second plane disposed on the second, opposite side of the web. The first, second and third flanges define first and second parallel, separated lateral pocket areas extending along the first side of the web, and third and fourth parallel, separated lateral pocket areas extending along said second side of the web.

In a preferred embodiment thereof, the connection members are also provided with special configurations. Each connection member has a base portion from which a connection portion transversely extends, the connection portion having an outer end surface through which a slot inwardly extends, the slot defining on the connection portion a parallel pair of tabs disposed on opposite sides of the slot.

At each transverse abutting stud joint in the overall construction system a preferred embodiment thereof, first and second ones of the extruded composite plastic/wood flour stud members are disposed in a transverse relationship with an end of the second stud member abutting the first stud member, and with the first pocket area of the first stud member being aligned with and facing the first and third pocket areas of the second stud member, and the second pocket area of the first stud member being aligned with and facing the second and fourth pocket areas of the second stud member.

The base portion of the first connection member is closely received in the first pocket area of the first stud member and is anchored to its web, and the tabs of the first connection member are closely received in and extend along the first and third pocket areas Of the second stud member and are anchored to opposite sides of its web.

The base portion of the second connection member is closely received in the second pocket area of the first stud member and is anchored to its web, and the tabs of the second connection member are closely received in and extend along the second and fourth pocket areas of the second stud member and are anchored to opposite sides of its web.

Illustratively, the connection members are anchored to the webs of their associated studs using self-tapping wood screws. However, other types Of anchoring means, such as nails or plastic weldments, could be used if desired. Due to the cooperatively configured shaped of the studs and the connection members, the connection members are conveniently recessed entirely within their associated studs.

The composite plastic/wood studs of the present invention provide in the overall construction system a variety of advantages over conventional solid wood studs used in this type of framing operation. Specifically, the extruded composite plastic/wood studs weigh less than solid wood studs of the same size, are fire retardant, do not absorb appreciable moisture, are highly resistant to insect damage, are straighter and less expensive than solid wood studs, and are environmentally friendlier due to their ability to use recycled plastic and wood.

BRIEF DESCRIPTION OF THE DRAWINGS

FIG. 1 is a simplified, vertically foreshortened side elevational view of a portion of a composite plastic/wood building construction system embodying principles of the present invention;

FIG. 2 is a longitudinally foreshortened perspective view of one Of the specially designed extruded composite plastic/wood stud members used in the building construction system;

FIG. 3 is an enlarged scale perspective view of the portion of the construction system within the dashed area "3" IN FIG. 1;

DETAILED DESCRIPTION

Figure 4:
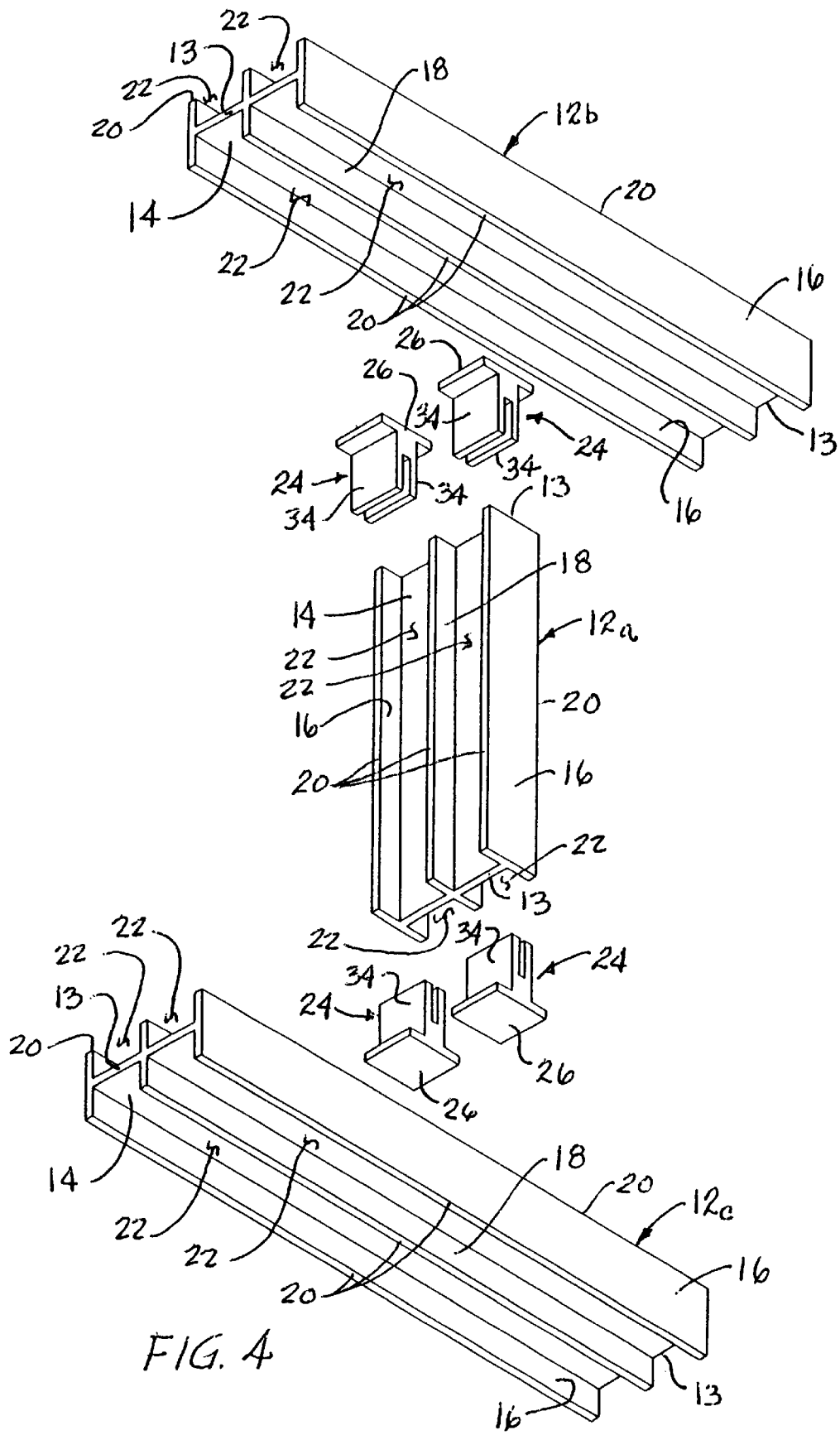
FIG. 4 is an exploded perspective view of the portion of the construction system shown in FIG. 3.

Elevationally illustrated in vertically foreshortened form in FIG. 1 is a portion of a stud-based building construction system 10 which embodies principles of the present invention. The building construction system 10 is representatively a section of a wall framing structure defined by spaced apart, parallel and vertically oriented studs 12a, a horizontally oriented top stud 12b, and a horizontally oriented bottom stud 12c. Horizontal studs 12b,12c respectively abut the top and bottom ends of the vertical studs 12a and are anchored thereto in a unique manner subsequently described herein.

In contrast to conventional frame construction of this general type, the studs 12a,12b,12c are not metal studs or solid wood studs. Instead, the studs 12a,12b,12c, which have identical cross-sections along their lengths, are of a unique construction and configuration that embodies principles of the present invention and will now be described in conjunction with FIG. 2 in which one of the studs, representatively stud 12b which has been longitudinally foreshortened for illustrative purposes, is perspectively illustrated at an enlarged scale.

Like the other studs 12a and 12c, the stud 12b is extruded from a heated mixture of plastic and a granular non-plastic filler material, cut to length and allowed to cool. Preferably, the plastic is polyethylene, the granular filler material is a wood flour material (i.e., sawdust which has been ground to a flour-like consistency), the weight ratio of the extrusion mixture is approximately 60% plastic and 40% filler material, and a suitable fire retardant material is added to the overall extrusion mixture. Other types of plastic may be used, as well as other types of filler material such as paper or glass, and other weight ratios, if desired. Representatively, each of the studs 12a,12b,12c has, along its length, essentially the same maximum width and thickness as a standard 2"×4" solid wood stud. However, it will be readily appreciated that the studs could have other widths and thicknesses, and could be formed in a wide variety of lengths other than the standard eight foot length of a conventional 2"×4" solid wood stud.

AS illustrated in FIG. 2, the representative stud 12b (like the other studs 12a and 12c) longitudinally extends along an axis A and has, along its length between its opposite ends 13, a cross-section defined by a substantially planar central rectangular web 14 having substantially planar transverse flanges 16 on its opposite outer edges, and a substantially planar central transverse reinforcing flange 18 disposed midway between the outer edge flanges 16. Each of the flanges 16,18 has opposite outer edges 20. The flange edges 20 disposed on a first side of the web 14 lie in a first plane, and the flange edges 20 disposed on the opposite side of the web 14 lie in a second plane parallel to the first plane. On each side of the web 14 the flanges 16,18 define therebetween a pair of separated lateral pockets 22 that open outwardly through opposite sides of the stud 12b and longitudinally extend along its entire length.

Turning now to FIGS. 3–6, the opposite ends 13 of each of the vertical studs 12a abut the horizontal studs 12b,12c and are firmly anchored thereto using recessed joining members in the form of specially designed lock blocks 24 embodying principles of the present invention. Each lock block 24 is representatively formed from the same composite material as the studs 12a,12b,12c, but is preferably formed using an injection molding process as opposed to an extrusion process.

Figure 5:
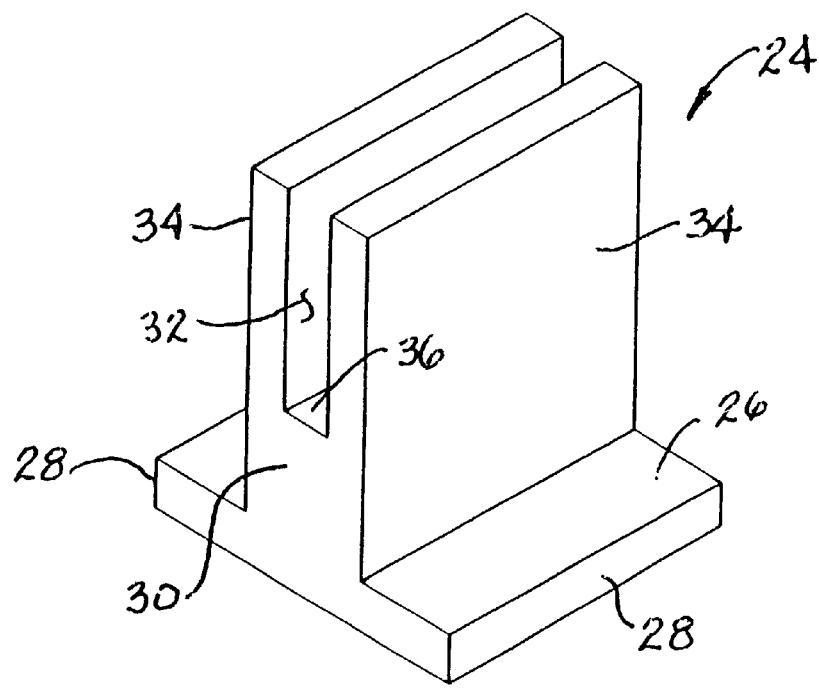
FIG. 5 is an enlarged scale perspective view of one of the specially designed molded composite plastic/wood stud joining members used in the building construction system.

As best illustrated in FIG. 5, each lock block 24 has a rectangular base portion 26 sized to be complementarily received within one of the side pockets 22 of the stud 12b or the stud 12c with opposite end surfaces 28 the base portion 26 being directed toward the opposite ends 13 of their associated stud. Extending upwardly from a central section of the base portion 26 is a rectangular connection portion 30. A central slot 32 extends inwardly from the upper end of the connection portion 30 and defines on the connection portion 30 a parallel pair of vertical connection tabs 34 disposed on opposite horizontal sides of the slot 32. The inner side surface 36 of the slot 32 is spaced upwardly apart from the top side of the base portion 26 as viewed in FIG. 5.

The transverse, abutting securement of the lower end 13 of a representative one of the vertical studs 12a to the horizontal bottom stud 12c will now be described in conjunction with FIGS. 3 and 6, with the understanding that the method of securing the top end 13 of the representative stud 12a to the horizontal top stud 12b is identical.

Figure 6:
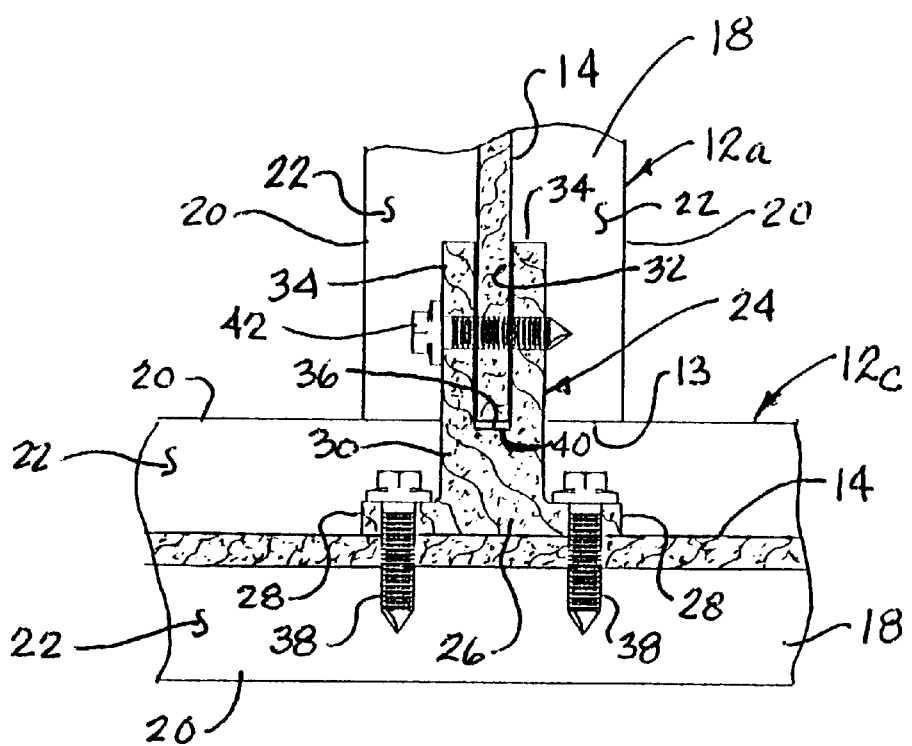
FIG. 6 is an enlarged scale cross-sectional view through a portion of the construction system taken along line 6—6 of FIG. 3.

First, as illustrated in FIGS. 3 and 6, the base portions 26 of two of the lock blocks 24 are placed in an aligned relationship within the two parallel top side pockets 22 of the bottom stud 12c, with the inserted base portions 26 abutting the top side of the bottom stud web 14 on opposite sides of the central flange 18 of the bottom stud 12c. Suitable fasteners, such as the illustrated self-tapping wood screws 38, are then driven through the base portions 26 on opposite sides of their associated connection portions 30.

Next, lower end portions of the web 14 on opposite sides of the central flange 18 of the vertical stud 12a are inserted downwardly into the slots 32 of the two lock blocks 24 until the lower end 13 of the stud 12a abuts the top side of the bottom stud 12c. The widths of the tabs 34 of the two lock blocks 24 are the same as the widths of their associated base portions 26. Accordingly, as the lower end 13 of the vertical stud 12a approaches the top side of the bottom horizontal stud 12c, the tabs 34 are received in the four lateral pockets 22 of the vertical stud 12a, thereby precisely aligning the front and rear faces of the studs 12a,12c as viewed in FIG. 3.

The depths of the lock block recesses 26 are dimensioned so that when the bottom end 13 of the vertical stud 12a bottoms out on the top side of the bottom horizontal stud 12c, small clearance spaces 40 (see FIG. 6) are left between the lower end of the vertical stud web 14 and the bottom side surfaces 36 of the two lock block slots 32 that receive the web 14. These clearances 40 prevent the bottom end of the vertical stud web 14 from undesirably bearing vertically on the underlying lock blocks 26.

After the vertical stud 12a is in place as depicted in FIGS. 3 and 6, the tabs 34 of each of the two underlying lock blocks 26 are suitably anchored to the vertical stud web 14 by using, for example, fasteners such as the indicated self-tapping wood screws 42. A variety of fastening means other than the wood screws 38 and 42, such as nails or plastic welding, may be used to operatively anchor the lock blocks 26 to the vertical and horizontal studs 12a,12c if desired. By using these specially designed lock blocks 26, all of the vertical studs 12a (see FIG. 1) can be firmly anchored at their ends to and in an abutting relationship with the horizontal top and bottom studs 12b,12c.

The lock blocks 26, coupled with the uniquely configured cross-sections of the studs 12a,12b,12c, provides the building construction system 10 with an overall strength at its joints which is substantially greater than in conventionally configured and constructed solid wood stud-based frame construction systems of this same general shape. It should be noted that the lock blocks 26 may be formed of materials other than a plastic/wood composite material, and may be used with flanged stud structures which are made of materials other than a plastic/wood composite material. It should also be noted that the lock blocks 26 are completely recessed within their associated studs 12. This permits the opposite sides of the construction system 10 (see FIG. 1) to be completely free of undesirable protrusions created by the joining structures used to operatively interconnect the studs 12.

The use of the specially designed plastic/wood flour composite studs 12 provides the overall structure 10 with a variety of advantages over conventional solid wood stud-based structures. Specifically, the studs 12 weigh less than solid wood studs of the same size, are fire retardant, do not absorb appreciable moisture, are highly resistant to insect damage, are straighter and less expensive than solid wood studs, and are environmentally friendlier due to their ability to use recycled plastic and wood.

The foregoing detailed description is to be clearly understood as being given by way of illustration and example only, the spirit and scope of the present invention being limited solely by the appended claims.

What is claimed is:

1. Construction apparatus comprising:
   an extrusion useable as a structural building stud, said extrusion being formed from a mixture of a plastic material and a non-plastic filler material and having, along its length, a cross-section defined by a substantially planar rectangular web having opposite side edges, first and second substantially planar transverse flanges formed on said opposite side edges, and a third substantially planar transverse flange formed on a central portion of said web and being parallel to said first and second flanges, said first, second and third flanges having first outer side edges lying in a first plane disposed on a first side of said web, and second outer side edges lying in a second plane disposed on the second, opposite side of said web, said first, second and third flanges defining on each of the opposite sides of said web a divided pair of parallel lateral pockets that open outwardly through opposite sides of said extrusion and longitudinally extend from one end of said extrusion to the opposite end of said extrusion; and
   a connection member for securing an elongated structural member having a web portion to said extrusion in a transversely abutting relationship, said connection member having:
      a base portion from which a connection portion transversely extends, said connection portion having an outer end surface through which a slot inwardly extends, said slot defining on said connection portion a parallel pair of tabs disposed on opposite sides of said slot,
      said base portion being complementarily receivable in one of said lateral pockets of said extrusion and anchorable to said web of said extrusion, said connection portion being dimensioned to project transversely outwardly of said extrusion so that said slot may receive the web portion of the structural member and said tabs may be anchored thereto.

2. The construction apparatus of claim 1 wherein:
said connection member is formed from a mixture of a plastic material and a non-plastic filler material.

3. The construction apparatus of claim 2, wherein:
said connection member said connection member is formed from a mixture of polyethylene and wood flour.

4. The construction apparatus of claim 3 wherein:
said mixture of said connection member further includes a fire retardant material.

5. The construction apparatus of claim 3 wherein:
said connection member is an injection molding.

6. A construction system comprising:
first and second elongated stud members each having, along its length, a cross-section at least partially defined by a generally planar web from which first and second parallel flanges transversely project and define therebetween on opposite sides of said web a lateral pocket area opening outwardly through one side of the stud member,
said first and second stud members being in a transverse relationship with an end of said second stud member abutting said first stud member, and with one of said lateral pocket areas of said first stud member being aligned with said lateral pocket areas of said second stud member; and
a connection member having a base portion closely received in said one of said lateral pocket areas of said first stud member and being anchored to said web of said first stud member, and a pair of tabs closely received and extending through said lateral pocket areas of said second stud member, said tabs being disposed on opposite sides of and anchored to said web of said second stud member.

7. The construction system of claim 6 wherein:
said first and second stud members are extrusions formed from a plastic/wood flour mixture.

8. The construction system of claim 6 wherein:
said connection member is an injection molding formed from a plastic/wood flour mixture.

9. A construction system comprising:
first and second elongated stud members each having along its length, a cross-section defined by a substantially planar rectangular web having opposite side edges, first and second substantially planar transverse flanged formed on said opposite side edges, and a third substantially planar transverse flange formed on a central portion of said web and being parallel to said first and second flanges, said first, second and third flanges defining first and second parallel, separated lateral pocket areas extending along said first side of said web, and third and fourth parallel, separated lateral pocket areas extending along said second side of said web;

said first and second stud members being in a transverse relationship with an end of said second stud member abutting said first stud member, and with said first pocket area of said first stud member being aligned with and facing said first and third pocket areas of said second stud member, and said second pocket area of said first stud member being aligned with and facing said second and fourth pocket areas of said second stud member; and first and second connection members each having a base portion and a spaced apart pair of parallel tabs transverse to said base portion, said base portion of said first connection member being closely received in said first pocket area of said first stud member and being anchored to its web, and said tabs of said first connection member being closely received in and extending along said first and third pocket areas of said second stud member and being anchored to opposite sides of its web, and said base portion of said second connection member being closely received in said second pocket area of said first stud member and being anchored to its web, and said tabs of said second connection member being closely received in and extending along said second and fourth pocket areas of said second stud member and being anchored to opposite sides of its web.

10. The construction system of claim 9 wherein:
said first and second stud members and said first and second connection members are formed from a mixture of a plastic material and a non-plastic filler material.

11. The construction system of claim 10 wherein:
said plastic material is a polyethylene material.

12. The construction system of claim 10 wherein:
said non-plastic material is a granular non-plastic filler material.

13. The construction system of claim 12 wherein:
said granular non-plastic filler material is sawdust.

14. The construction system of claim 12 wherein:
said granular non-plastic filler material is wood flour.

15. The construction system of claim 10 wherein:
said mixture further includes a fire retardant material.

16. The construction system of claim 10 wherein:
said plastic material is a polyethylene material, and said non-plastic filler material is wood flour.

17. The construction system of claim 16 wherein:
the constituent weight ratio of said mixture is about 60 percent polyethylene and about 40 percent wood flour.

18. The construction system of claim 16 wherein:
said mixture further includes a fire retardant material.

19. The construction system of claim 16 wherein:
each of said first and second stud members is an extrusion.

20. The construction system of claim 16 wherein each of said first and second connection members is an injection molding.

21. The construction system of claim 9 wherein:
said first and second connection members are completely recessed in said first and second stud members.

22. The construction system of claim 9 wherein:
said first and second connection members are anchored to said webs of said first and second stud members by means of mechanical fastening members.

23. The construction system of claim 9 wherein:
said first, second and third flanges have first outer side edges lying in a first plane on a first side of said web, and second outer side edges lying in a second plane disposed on the second, opposite side of said web.

* * * * *